No. 755,801. Patented March 29, 1904.

UNITED STATES PATENT OFFICE.

ROBERT E. SCHMIDT, OF ELBERFELD, AND PAUL TUST, OF VOHWINKEL, GERMANY, ASSIGNORS TO FARBENFABRIKEN OF ELBERFELD CO., OF NEW YORK, N. Y., A CORPORATION OF NEW YORK.

PROCESS OF MAKING ALPHA-OXYANTHRAQUINONE.

SPECIFICATION forming part of Letters Patent No. 755,801, dated March 29, 1904.

Application filed December 10, 1903. Serial No. 184,671. (No specimens.)

*To all whom it may concern:*

Be it known that we, ROBERT E. SCHMIDT, doctor of philosophy, chemist, residing at Elberfeld, and PAUL TUST, chemist, residing at Vohwinkel, near Elberfeld, Germany, (assignors to the FARBENFABRIKEN OF ELBERFELD COMPANY, of New York,) have invented a new and useful Improvement in Processes of Making Alpha-Oxyanthraquinone; and we hereby declare the following to be a clear and exact description of our invention.

Our new process consists in causing alkaline earths to act on anthraquinone-alpha-sulfonic acid or its salts, which can be obtained by the action of sulfonating agents on anthraquinone in the presence of mercury or mercury compounds, as is described in the United States Letters Patent No. 743,664, dated November 10, 1903. By means of this process alpha-oxyanthraquinone (erythrooxyanthraquinone) is obtained in a pure state.

In carrying out our invention we can proceed as follows, the parts being by weight: In an autoclave provided with a stirrer a mixture of twenty-five parts of the potassium salt of anthraquinone-alpha-sulfonic acid, eighteen parts of calcium hydroxid, $(Ca[OH]_2,)$ and four hundred parts of water is heated to 190° centigrade for from three to four hours. On acidulating the mixture while boiling with hydrochloric acid the alpha-hydroxyanthraquinone is precipitated in a pure state. The process proceeds in an analogous manner if other alkaline earths or mixtures of these bodies, or if other salts of the anthraquinone-alpha-sulfonic acid, or the free acid itself, be used.

Having now described our invention and in what manner the same is to be performed, what we claim as new, and desire to secure by Letters Patent, is—

1. The new process for producing alpha-hydroxyanthraquinone, which process consists in first heating an aqueous mixture containing anthraquinone-alpha-monosulfonic acid and an alkaline earth, and then isolating the resulting alpha-hydroxyanthraquinone from the reaction mass, substantially as hereinbefore described.

2. The new process for producing alpha-hydroxyanthraquinone, which process consists in first heating an aqueous mixture containing anthraquinone-alpha-monosulfonic acid and a mixture of alkaline earths, and then isolating the resulting alpha-hydroxyanthraquinone from the reaction mass, substantially as hereinbefore described.

3. The new process for producing alpha-hydroxyanthraquinone, which process consists in first heating a mixture of anthraquinone-alpha-monosulfonic acid with calcium hydroxid and water to about 190° centigrade, and then separating the resulting alpha-hydroxyanthraquinone from the reaction mass by acidulation with hydrochloric acid, substantially as hereinbefore described.

In testimony whereof we have signed our names in the presence of two subscribing witnesses.

ROBERT E. SCHMIDT.
PAUL TUST.

Witnesses:
OTTO KÖNIG,
J. A. RITTERSHAUS.